T. W. Pratt,
Draw Bridge.
No. 100,065.   Patented Feb. 22, 1870.
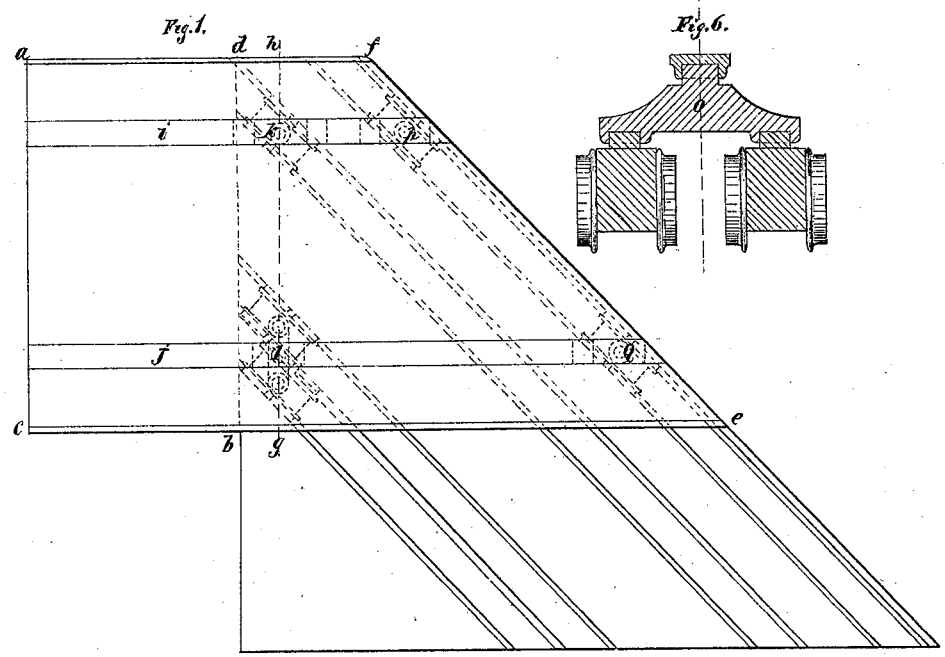
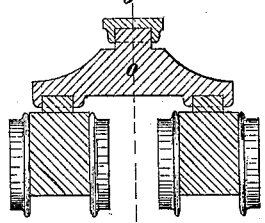
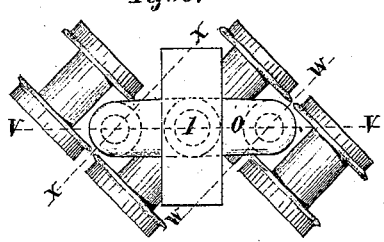
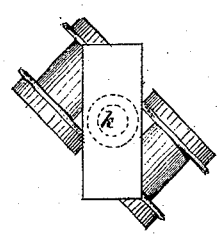
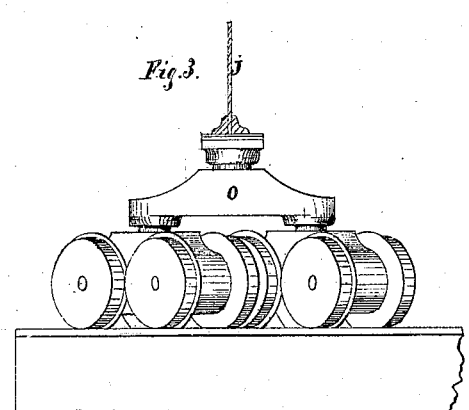
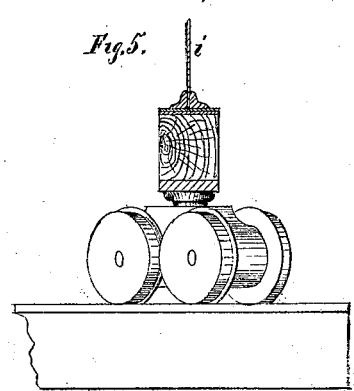
Witnesses:
Charles Carr.
Arthur A. Burr.
Inventor:
T. Willis Pratt

United States Patent Office.

T. WILLIS PRATT, OF BOSTON, MASSACHUSETTS, ASSIGNOR TO HIMSELF AND BOSTON MACHINE COMPANY.

Letters Patent No. 100,065, dated February 22, 1870.

IMPROVEMENT IN DRAW-BRIDGES.

The Schedule referred to in these Letters Patent and making part of the same.

I, T. WILLIS PRATT, of Boston, in the county of Suffolk, and State of Massachusetts, have invented certain Improvements in Draw-Bridges, of which the following is a specification.

My invention relates to draw-bridges, whereby the weight of the movable platform of such bridges may be more nearly equalized on the wheels and bearings.

Having determined the general plan and mode of movement of the draw-platform, whether the movement is directly in line with the bridge, oblique to it, or around a pivot, the weight of the whole platform can be estimated, and also the weight borne at the principal points near the middle of the girders. The number of wheels may then be determined, and it is advisable not to exceed four tons upon a single wheel.

The wheels I have adopted are the ordinary chilled truck-wheels, steam-railroad pattern, of about eighteen inches diameter, placed twelve inches apart, which is the length of the axle between the hubs. The whole of this twelve inches to be truly turned for a bearing for the boxes of the carriages, which carriage may be of cast-iron, all in one piece, twelve inches wide, and fitted to the axles.

When one carriage only is used, the weight may be borne on a boss on the center of the carriage. If two are required, the equalizing-bar is to be laid across, the two carriages being placed as near as may be to each other; thus the eight wheels will have an equal bearing, which has not been the case heretofore, as the bearings for the wheel-shafts have been rigidly attached to the moving draw or to the foundation.

If the draw is to move around a pivot, the pivot being at the side or center, whether in a whole or part of a circle, the wheels must have a beveled tread, which bevel and the center line of the axles must point to the center of the center pivot of the bridge, but otherwise carriages and axles may be made, as above described, for the movement in a right line.

In pivot-draws, the rails had better be of cast-iron, to have the same bevel as the wheels.

Figure 1 is a general plan of an oblique retractile draw, showing the rails on which it is moved.

Figure 2 is an enlarged plan of double truck at $l$, fig. 1.

Figure 3 is a side elevation of fig 2, showing the connection with the girder J.

Figure 4 is a plan of single truck at $k$, fig. 1.

Figure 5 is an elevation of fig. 4, showing the connection with the girder $i$.

Figure 6 is a cross-section of fig. 2, on lines V V and W W and X X.

$a\ b\ c\ d$ is the part of the draw extending over the draw space, and $b\ d\ e\ f$ the part which should overbalance it.

From the nature of the case, the greatest weight will be borne along the line $g\ h$, and as the platform is mainly supported by the girders $i$ and J, the principal weight is concentrated at the points $k$ and $l$.

At $k$ and $l$ are placed one or more carriage frames, somewhat similar to railroad-car trucks, with proper boxes, bearing upon the axles of two pairs of ordinary railroad car-wheels, to each carriage.

$o$, figs. 2, 3, and 6, is an equalizing-bar, upon the middle of which rests the weight of the draw $a\ c\ e\ f$, which is concentrated at these points $k\ l$, on line $g\ h$, consequently each carriage will carry half the weight, the whole weight being equally distributed through all the wheels.

Other wheels are placed at $p$ and $Q$, in numbers according to the weight to be borne at those points.

Claim.

I claim as my invention—

The application to draw-bridges of the above-described mode of equalizing the weight borne upon the wheels and carriages, substantially as described, and for the purpose set forth.

T. WILLIS PRATT.

Witnesses:
CHARLES CARR,
ARTHUR A. BURR.